(No Model.)

R. M. PHILLIPS.
SEED PLANTER.

No. 494,592.                    Patented Apr. 4, 1893.

WITNESSES
L. M. Thomas
L. E. Harris

INVENTOR
R. M. Phillips
by J. Milo Harris
his Attorney

THE NORRIS PETERS CO., PHOTO-LITHO., WASHINGTON, D. C.

UNITED STATES PATENT OFFICE.

RALPH M. PHILLIPS, OF WATTS FLATS, NEW YORK.

SEED-PLANTER.

SPECIFICATION forming part of Letters Patent No. 494,592, dated April 4, 1893.

Application filed April 7, 1892. Serial No. 428,136. (No model.)

*To all whom it may concern:*

Be it known that I, RALPH M. PHILLIPS, a citizen of the United States, residing at Watts Flats, in the county of Chautauqua and State of New York, have invented certain new and useful Improvements in Seed-Planters; and I do hereby declare that the following is a full, clear, and exact description of the invention, which will enable others skilled in the art to which it appertains to make and use the same.

Figure 1:
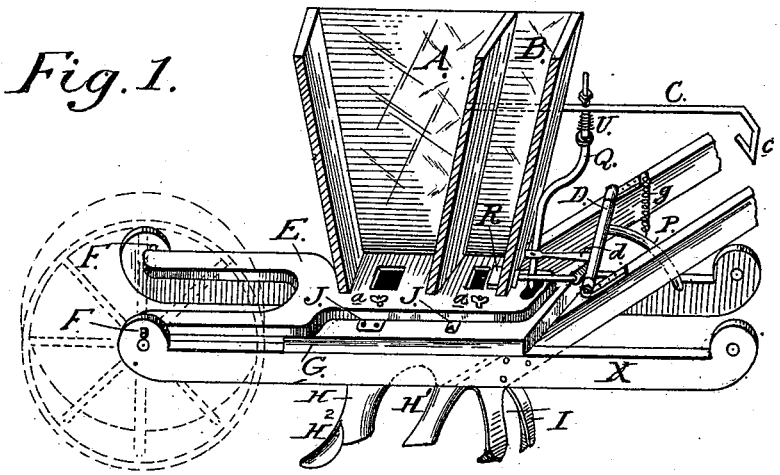
Figure 2:
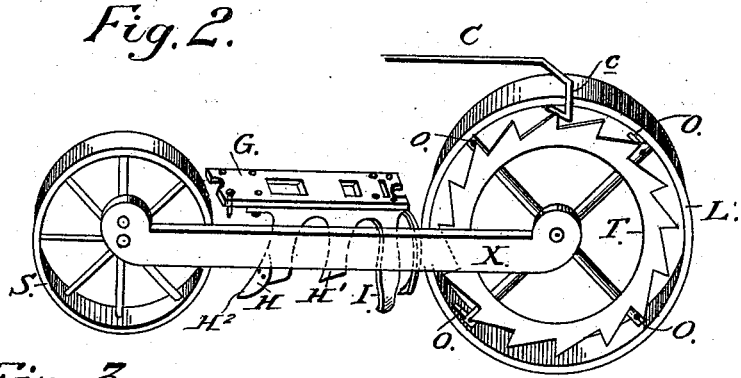
Figure 3:
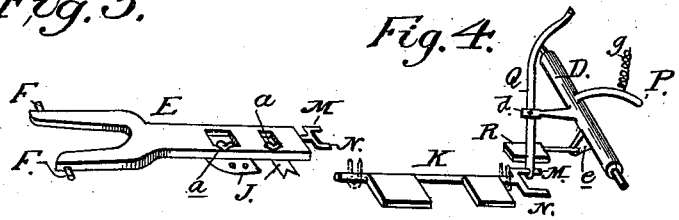
Figure 4:
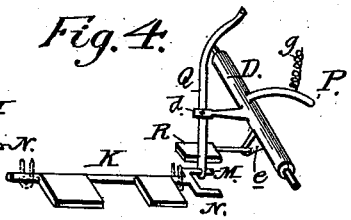

The object of my invention is to make a seed planter particularly adapted for the planting of small grains for garden use and one that may be used by hand or power—also to combine with the same a successful phosphate distributer, and the improvement consists in the construction and arrangement of parts with each other to produce the desired result as will be fully understood by this specification and the accompanying drawings in which Figure 1, is a sectional side elevation, showing seed box, &c. Fig. 2, is a perspective of main frame and wheels; Fig. 3, a detailed view of bottom of seed box; Fig. 4, a detailed view of dumping plates and connections.

In the drawings X represents the frame of my planter having suitable journal bearings for the front wheel S, and the rear drive wheel L, as shown in Fig. 2. The front wheel S may be all metal, or part wood if prefered, of suitable dimensions. The rear driving wheel may be cast whole or in sections, and has a broad rim having an inner circular ratchet cast or securely fastened to the spokes of the wheel as shown, there are holes through the spokes of the wheel near the rim to receive the operating pins O, O, O, O when desired to plant in hills as will be hereinafter more fully explained. The casting G as seen in Fig. 2 is then raised to show its form more clearly, but is securely screwed or bolted to the top edge of frame X. Front boot H, has an opening through which the phosphate descends into the furrow made by the cultivator tooth attached to its front side, the casting G, has another boot H' in the rear of H through which the seed is carried to the furrow and at the rear corners descend long projections or coverers of suitable form to carry the dirt over the phosphate and seed dropped into the furrow, and the broad wheel L, passing onto this ridge presses the dirt compactly on the seed. The bottom of the combined phosphate and seed box is shown detached in Fig. 3, being hinged at its front end by pins F F having bearings in the main frame X, in line with the wheel S. This bottom is of sufficient thickness so that the holes through its center will form cups large enough to hold the desired amount of phosphate and seed for one hill, and the amount to be dropped each time is further regulated by the slides J, which are held in place by the thumb screws $a, a$. The rear slide may be changed so that the forked end will be in when very small seed are to be planted.

The apartment A of the box is used for phosphate and B for the seed.

C is the ratchet lever having its end operated up and down by the teeth of the ratchet wheel, its front end being securely fastened to the combined phosphate and seed box the ratchet lever C causing the box to shake so as to keep phosphate and seed well agitated, causing a uniform flow of each.

In Fig. 4, K, represents two dump plates that cover the openings in casting G, foming the bottom of cups, being secured on the rod having forked ends M and N. R, is a cut off slide that operates in the bottom of the seed box and is drawn in and out by the motion given by the armed rod D, which has bearings on the handles of the planter, having arm $e$ to shove cut off plate R, and $d$ to give motion to rod Q and arm P, that strikes pins O, O, O, O, to give it motion when planting in hills.

The operation is as follows: Put phosphate and seed in their respective boxes, set the planter in motion by shoving on the handles or by other power when desired, a furrow is opened by the cultivator tooth $H^2$ attached to boot H, the lever C, is moved up and down on the ratchet wheel, giving motion to the phosphate and seed boxes. When desired to sow in drills, take out the pegs O, O, O, O, and hook the rod Q on the fork M; if desired to plant in hills three feet apart put one peg O, in one of the spokes, if eighteen inches apart put in two on opposite sides and if nine inches put in all of them; (if longer distance is needed pegs can be set off farther from the center) put rod Q on fork N which opens the sewing plate K, and the shut off R, holds the seed back while the seed in cup is being dropped.

Only the lower portions of handles are shown in the drawings. Horse power may be used to propel the planter. When so desired seed can be readily planted without the phosphate if thought best. Phosphate is covered before the seed falls. The shut off keeps seed and phosphate from falling at end of row.

Having described my improvements, I claim—

1. In seed planters the combined seed and phosphate box A, B, hinged at or near its front end, pawl rod C secured at the rear of said box, the other end of the rod crooked as shown, in combination with ratchet driving wheel L, said wheel being provided with ratchets to vibrate the seed box and pins O, O, O O, with suitable connections to operate the cut off plate substantially as shown and described.

2. In seed planters the combined seed and phosphate box A, B, hinged at its front end, pawl rod C, made as shown, driving wheel L, suitably mounted in frame at the rear end of planter and provided with ratchets to operate the seed box, and pins with suitable connections to operate cut off plate, in combination with casting G having boots for seed and phosphate and rear covering plows, all made and arranged to operate in the manner shown and described.

3. In seed planters the ratchet wheel L, pawl rod C, hinged seed box, cast furrow opener and coverer I, having openings for seed and phosphate as shown, in combination with the armed rod D, having bearings on the handles of the planter, with arms for operating cut off plate R, and dump plates K, substantially as shown and for the purpose set forth.

4. In seed planters the frame X, wheels S and L, rod C,—a box having apartments A, B, and hinged at its front end, casting G, rod D, having arms P, *d*, and *e*, cut off R, drop plate K having forked rods M, and N, all made and arranged to operate substantially in the manner shown and for the purpose set forth.

In testimony whereof I have hereunto set my hand in presence of two witnesses.

RALPH M. PHILLIPS.

Witnesses:
N. E. THOMAS,
H. C. EDDY.